(12) United States Patent
Verma et al.

(10) Patent No.: US 10,863,564 B2
(45) Date of Patent: Dec. 8, 2020

(54) WIRELESS CONNECTION MANAGEMENT FOR AN ACCESSORY DEVICE

(71) Applicant: Apple Inc., Cupertino, CA (US)

(72) Inventors: Sanjay K. Verma, San Jose, CA (US); Deepankar Bhattacharjee, Milpitas, CA (US); Prateek Sharma, Milpitas, CA (US); Rohan C. Malthankar, San Jose, CA (US); Ajoy K. Singh, Milpitas, CA (US); Najeeb M. Abdulrahiman, Fremont, CA (US)

(73) Assignee: Apple Inc., Cupertino, CA (US)

( * ) Notice: Subject to any disclaimer, the term of this patent is extended or adjusted under 35 U.S.C. 154(b) by 120 days.

(21) Appl. No.: 15/995,739

(22) Filed: Jun. 1, 2018

(65) Prior Publication Data

US 2019/0104559 A1 Apr. 4, 2019

Related U.S. Application Data

(60) Provisional application No. 62/565,811, filed on Sep. 29, 2017.

(51) Int. Cl.
*H04W 48/16* (2009.01)
*H04W 88/04* (2009.01)
*H04W 76/15* (2018.01)
*H04W 76/14* (2018.01)
*H04W 76/23* (2018.01)

(52) U.S. Cl.
CPC .......... *H04W 76/15* (2018.02); *H04W 48/16* (2013.01); *H04W 76/14* (2018.02); *H04W 76/23* (2018.02); *H04W 88/04* (2013.01)

(58) Field of Classification Search
CPC ..................................................... H04W 48/16
USPC ............................................................ 370/329
See application file for complete search history.

(56) References Cited

U.S. PATENT DOCUMENTS

| 9,414,232 | B2 | 8/2016 | Louboutin | |
|---|---|---|---|---|
| 9,712,657 | B2 | 7/2017 | De Filippis | |
| 9,800,707 | B2 | 10/2017 | Vissa | |
| 9,900,773 | B2 | 2/2018 | Bae | |
| 2014/0304078 | A1* | 10/2014 | Abraham | G06Q 30/0264 705/14.61 |
| 2014/0366105 | A1* | 12/2014 | Bradley | H04L 63/083 726/5 |

(Continued)

*Primary Examiner* — Angel T Brockman
(74) *Attorney, Agent, or Firm* — Kowert, Hood, Munyon, Rankin & Goetzel, P.C.

(57) ABSTRACT

This disclosure relates to wireless connection management for an accessory device. A companion device and the accessory device may establish a wireless link. The companion device may associate with a Wi-Fi access point. The companion device may determine whether the Wi-Fi access point supports access by the accessory device to a wide area network. The companion device may determine whether to provide association information for the Wi-Fi access point to the accessory device based at least in part on whether the Wi-Fi access point supports access by the accessory device to the wide area network. The companion device may monitor whether the Wi-Fi access point continues to support access by the accessory device to the wide area network, and may indicate to the accessory device to disassociate with the Wi-Fi access point if the Wi-Fi access point no longer supports access by the accessory device to the wide area network.

18 Claims, 5 Drawing Sheets

(56) References Cited

U.S. PATENT DOCUMENTS

2017/0064760 A1  3/2017  Kandagadla

* cited by examiner

WIRELESS CONNECTION MANAGEMENT FOR AN ACCESSORY DEVICE

PRIORITY INFORMATION

This application claims priority to U.S. provisional patent application Ser. No. 62/565,811, entitled "Wireless Connection Management for an Accessory Device," filed Sep. 29, 2017, which is hereby incorporated by reference in its entirety as though fully and completely set forth herein.

TECHNICAL FIELD

The present application relates to wireless communication, including to techniques for managing the wireless connections of an accessory wireless device.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Typically, wearable devices have relatively limited wireless communications capabilities and typically have smaller batteries than larger portable devices, such as smart phones and tablets. In general, it would be desirable to reduce the power requirements of communication devices. Therefore, improvements in the field are desired.

SUMMARY

Embodiments are presented herein of, inter alia, systems, apparatuses, and methods for managing the wireless connections of an accessory wireless device.

The accessory wireless device may be a link budget limited device, such as an accessory device with a relatively limited communication range, e.g., due to device design constraints. Additionally or alternatively, battery power may be a limited resource for the accessory wireless device, such that managing the power consumption resulting from cellular service operations may be desirable.

The accessory wireless device may be paired with a companion wireless device, which may assist the accessory wireless device with wireless connectivity and/or in any of various other aspects. For example, the companion wireless device may provide association information for Wi-Fi access points that it associates with, e.g., if it determines that a Wi-Fi access point is suitable for the accessory wireless device. However, there may be scenarios in which a Wi-Fi access point that the companion wireless device associates with is determined not to be suitable for the accessory wireless device, for example if the Wi-Fi access point has limited or no throughput to a wide area network such as the Internet, or if the Wi-Fi access point provides a captive network (e.g., requests captive portal registration) and the accessory wireleess device is not configured to perform captive portal registration.

Thus, according to some aspects of this disclosure, the companion wireless device may determine whether each Wi-Fi access point it associates with is suitable for the accessory wireless device (e.g., supports access by the accessory wireless device to a wide area network), and determine whether to provide association information for the Wi-Fi access point to the accessory device based at least in part on the result of that determination. Further, the companion device may continue to monitor or occasionally check whether a Wi-Fi access point continues to be suitable for the accessory wireless device, and may indicate to the accessory device to disassociate with and/or delete the association information for the Wi-Fi access point if the Wi-Fi access point becomes unsuitable for the accessory wireless device.

Additionally or alternatively, the accessory wireless device may perform various operations to manage its own wireless connectivity. For example, the accessory wireless device may have cellular communication capability in addition to Wi-Fi communication capability, and may monitor or occasionally check in which of multiple possible operating modes to operate its cellular communication circuitry. Determining in which operating mode to operate its cellular communication circuitry may be based at least in part on whether a Wi-Fi connection is available to the accessory wireless device, and further based at least in part on a status of the Wi-Fi connection. For example, the accessory wireless device may consider whether the accessory wireless device is associated with a Wi-Fi access point, whether the accessory wireless device has access to a wide area network via the Wi-Fi access point (and/or a length of time for which the accessory wireless device has or has not had access to a wide area network via the Wi-Fi access point). Additionally or alternatively, the accessory wireless device may consider one or more heuristics relating to recent cellular communication by the accessory device, an amount of data remaining in a data plan for a user of the accessory device, a data type of a pending data communication, and/or a current user activity level of a user of the accessory device when determining in which operating mode to operate its cellular communication circuitry, among various possible considerations.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
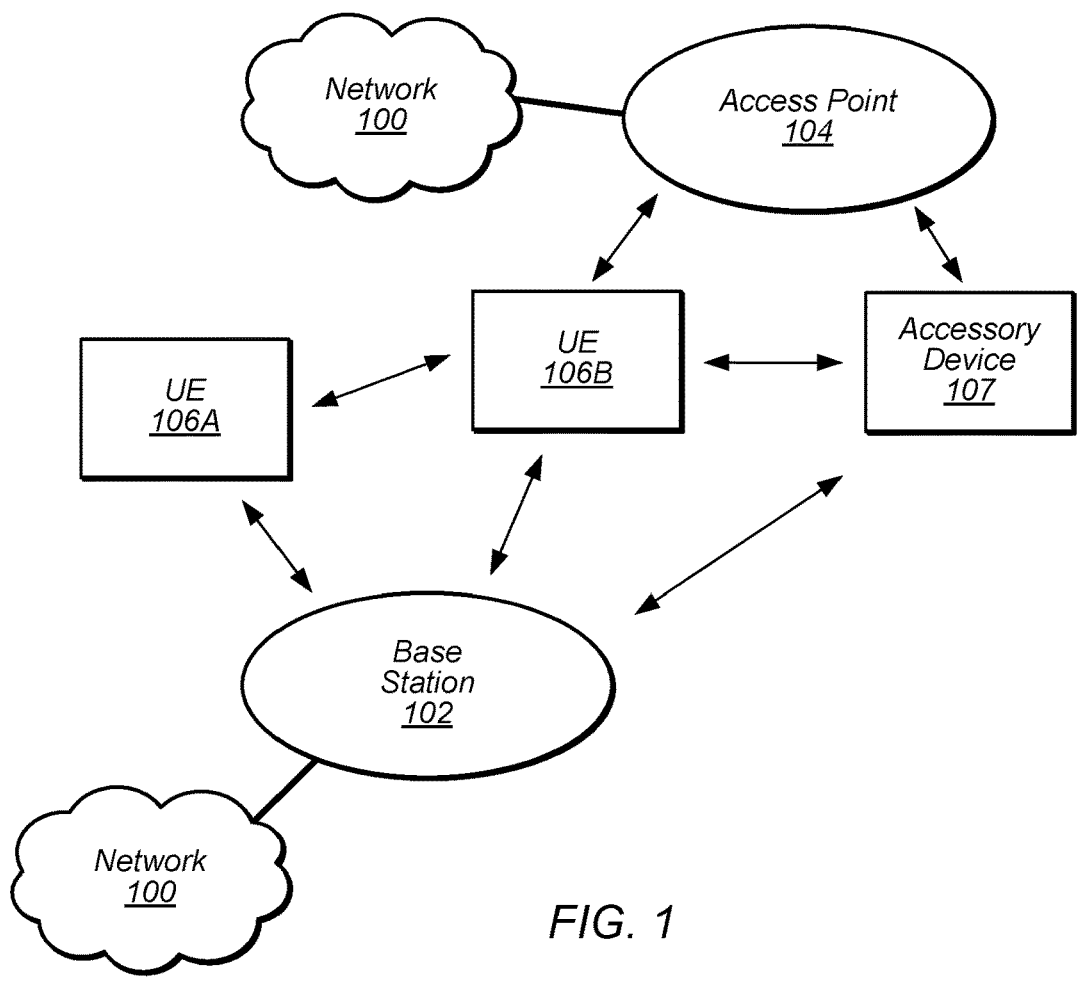
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, Play Station Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
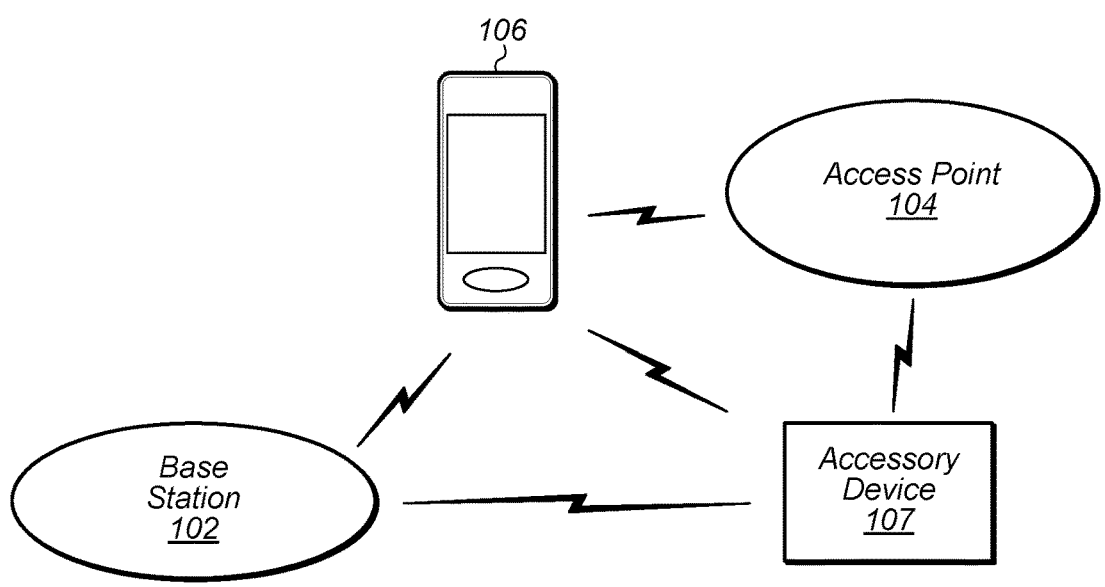
FIG. 2 illustrates an example system where an accessory device can selectively either directly communicate with a cellular base station or utilize the cellular capabilities of an intermediate or proxy device such as a smart phone, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device. The wireless embodiment described below is one example embodiment.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1×RTT, 1×EV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of a plurality of wireless communication technologies. For example, a UE device 106/107 might be configured to communicate using one or more of GSM, UMTS, CDMA2000, LTE, LTE-A, NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

As shown, the exemplary wireless communication system also includes a Wi-Fi access point 104, which communicates over a transmission medium with the wireless device 106B as well as accessory device 107. The Wi-Fi Access point also provides communicative connectivity to the network 100. Thus, according to some embodiments, wireless devices may be able to connect to either or both of the base station 102 (or another cellular base station) and the access point 104 (or another access point) to access the network 100 at a given time.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102.

The accessory device 107 includes cellular communication capability and hence is able to directly communicate with cellular base station 102. However, since the accessory device 107 is possibly one or more of communication, output power and/or battery limited, the accessory device 107 may in some instances selectively utilize the UE 106B as a proxy for communication purposes with the base station 102 and hence to the network 100, and/or may prioritize access to the network 100 obtained via the access point 104. In other words, the accessory device 107 may selectively use the cellular communication capabilities of its companion device (e.g., UE 106B) and/or its Wi-Fi communication capability to conduct its communications. The limitation on communication abilities of the accessory device 107 can be permanent, e.g., due to limitations in output power or the radio access technologies (RATs) supported, or temporary, e.g., due to conditions such as current battery status, inability to access a network, or poor reception.

FIG. 2 illustrates an example accessory device 107 in communication with base station 102. The accessory device 107 may be a wearable device such as a smart watch. The accessory device 107 may have cellular communication capability and be capable of directly communicating with the base station 102, as shown. FIG. 2 also illustrates the accessory device 107 in communication with access point 104. The accessory device 107 may also have Wi-Fi communication capability and be capable of directly communicating with the access point 104, as shown.

The accessory device 107 may also be capable of communicating with another device (e.g., UE 106), referred to as a proxy device, intermediate device, or companion device, using a short range communications protocol; for example, the accessory device 107 may according to some embodiments be "paired" with the UE 106. Under some circumstances, the accessory device 107 may use the cellular functionality of this proxy device for communicating cellular voice/data with the base station 102 and/or access point 104. In other words, the accessory device 107 may provide voice/data packets intended for the base station 102 or access point 104 over the short range link to the UE 106, and the UE 106 may use its cellular or Wi-Fi functionality to transmit (or relay) this voice/data to the base station/access point on behalf of the accessory device 107. Similarly, the voice/data packets transmitted by the base station/access point and intended for the accessory device 107 may be received by the cellular/Wi-Fi functionality of the UE 106 and then may be relayed over the short range link to the accessory device. As noted above, the UE 106 may be a mobile phone, a tablet, or any other type of hand-held device, a media player, a computer, a laptop or virtually any type of wireless device.

At least in some instances, the accessory device 107 may also or alternatively selectively utilize one or the other of cellular or Wi-Fi communication capability to communicate directly with a cellular base station or a Wi-Fi access point, e.g., even if both options may be available. For example, if both wireless link options are available and are capable of providing the communication services currently desired by the accessory device 107, the accessory device 107 might prioritize the Wi-Fi link, e.g., to potentially reduce device power consumption and/or if the Wi-Fi link is considered to have a lower economic cost. As described further subsequently herein, the UE 106 and/or the accessory device 107 may manage the wireless connectivity of the accessory device 107 in accordance with any of a variety of additional or alternative considerations at various times.

The UE 106 and/or 107 may include a device or integrated circuit for facilitating cellular communication, referred to as a cellular modem. The cellular modem may include one or more processors (processor elements) and various hardware components as described herein. The UE 106 and/or 107 may perform any of the method embodiments described herein by executing instructions on one or more programmable processors. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or 107 may include one or more antennas for communicating using two or more wireless communication protocols or radio access technologies. In some embodiments, the UE device 106/107 might be configured to communicate using a single shared radio. The shared radio may couple to a single antenna, or may couple to multiple antennas (e.g., for MIMO) for performing wireless communications. Alternatively, the UE device 106/107 may include two or more radios. Other configurations are also possible.

The accessory device 107 may be any of various types of devices that, in some embodiments, has a smaller form factor relative to a conventional smart phone, and may have one or more of limited communication capabilities, limited output power, or limited battery life relative to a conventional smart phone. As noted above, in some embodiments, the accessory device 107 is a smart watch or other type of wearable device. As another example, the accessory device 107 may be a tablet device, such as an iPad, with Wi-Fi capabilities (and possibly limited cellular communication capabilities). Thus, as defined above, the term "accessory device" refers to any of various types of devices that in some instances have limited or reduced communication capabilities and hence may selectively and opportunistically utilize the UE 106 as a proxy for communication purposes for one or more applications and/or RATs, and/or may otherwise selectively utilize its wireless communication capabilities. As previously noted, when the UE 106 is capable of being used by the accessory device 107 as a proxy, the UE 106 may be referred to as a companion device to the accessory device 107.

Figure 3:
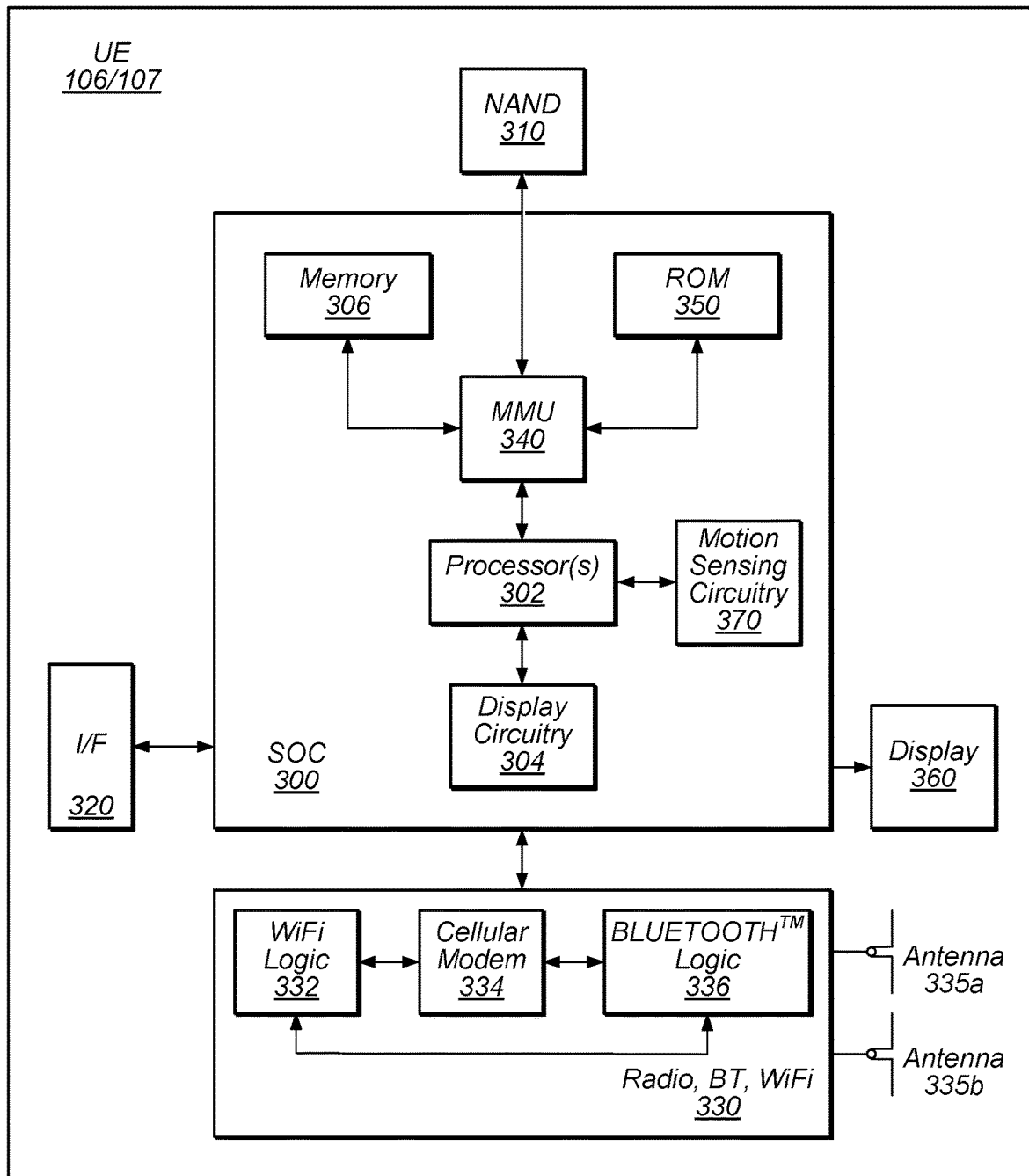
FIG. 3 is a block diagram illustrating an example wireless device, according to some embodiments.

FIG. 3—Example Block Diagram of a UE Device

FIG. 3 illustrates one possible block diagram of an UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. For example, one or more components of the wireless communication circuitry 330 (e.g., Wi-Fi logic 332, cellular modem 334, BT logic 336) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
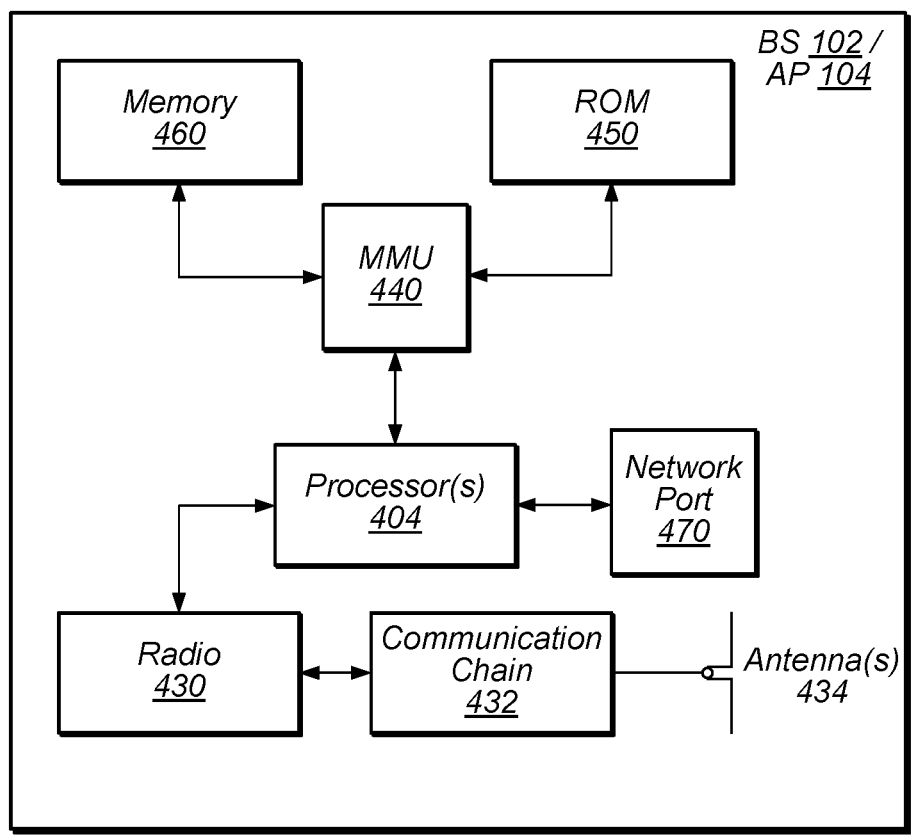
FIG. 4 is a block diagram illustrating an example base station, according to some embodiments.

FIG. 4—Block Diagram of a Base Station

FIG. 4 illustrates an example block diagram of a base station 102 or access point 104, according to some embodiments. It is noted that the base station of FIG. 4 is merely one example of a possible base station. As shown, the base station 102/access point 104 may include processor(s) 404 which may execute program instructions for the base station 102/access point 104. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102/access point 104 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. In some cases, the network port 470 may couple to a telephone network via the core network, and/or the core network may provide a telephone network (e.g., among other UE devices serviced by the cellular service provider).

The base station 102/access point 104 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102/access point 104 may be configured to communicate wirelessly using multiple wireless communication standards. In some instances, the base station 102 may include multiple radios, which may enable the base station 102 to communicate according to multiple wireless communication technologies. For example, as one possibility, the base station 102/access point 104 may include an LTE radio for performing communication according to LTE as well as a Wi-Fi radio for performing communication according to Wi-Fi. In such a case, the base station 102/access point 104 may be capable of operating as both an LTE base station and a Wi-Fi access point. As another possibility, the base station 102/access point 104 may include a multi-mode radio which is capable of performing communications according to any of multiple wireless communication technologies (e.g., LTE and Wi-Fi, LTE and UMTS, LTE and CDMA2000, UMTS and GSM, etc.). As still another possibility, the base station 102/access point 104 may be configured to act exclusively as a Wi-Fi access point, e.g., without cellular communication capability.

As described further subsequently herein, the BS 102/AP 104 may include hardware and software components for implementing or supporting implementation of features described herein. The processor 404 of the base station 102/access point 104 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102/AP 104, in conjunction with one or more of the other components 430, 432, 434, 440, 450, 460, 470 may be configured to implement or support implementation of part or all of the features described herein.

Figure 5:
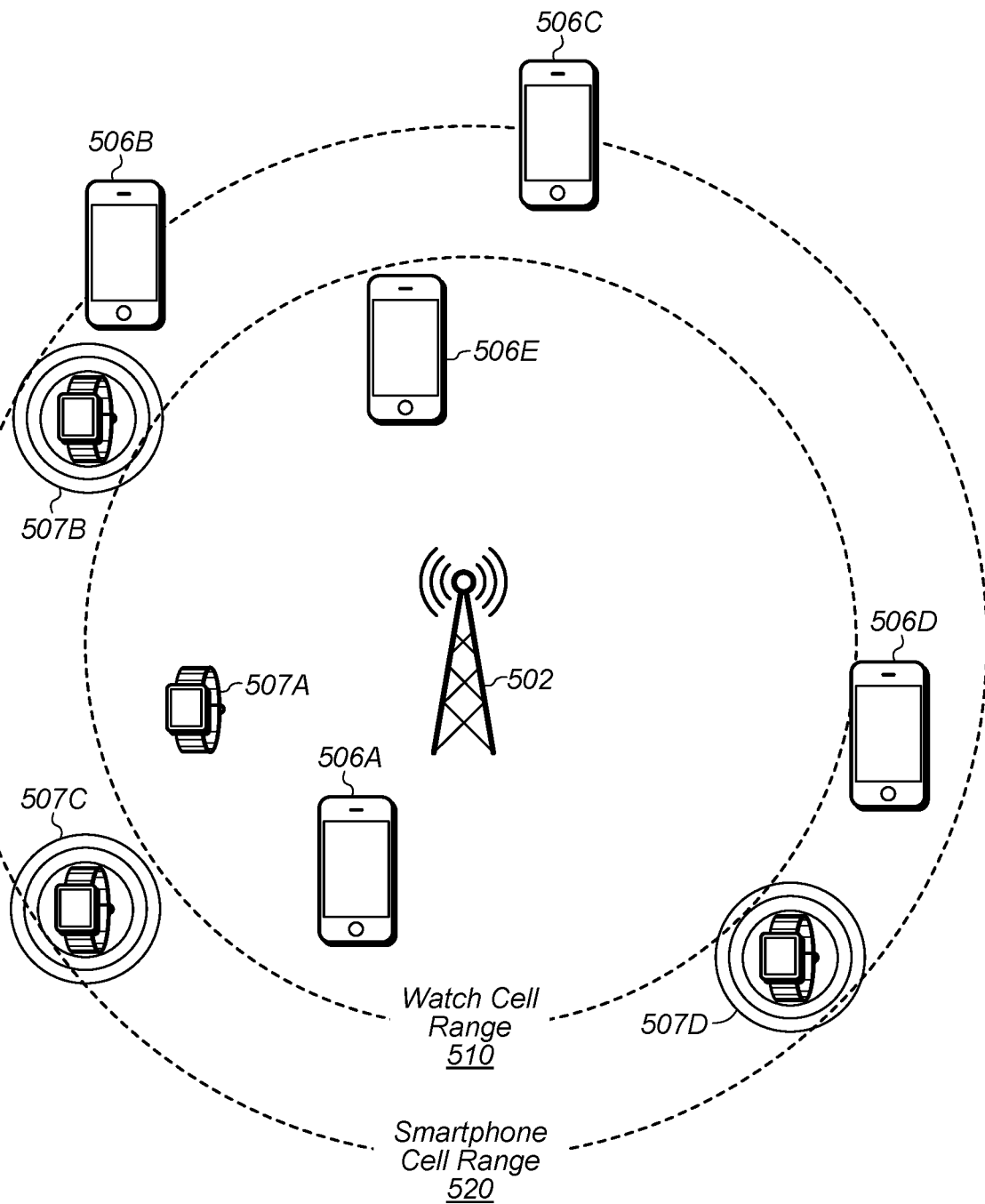
FIG. 5 illustrates a possible example coverage scenario for smartphones and smart watches, according to some embodiments.
Figure 6:
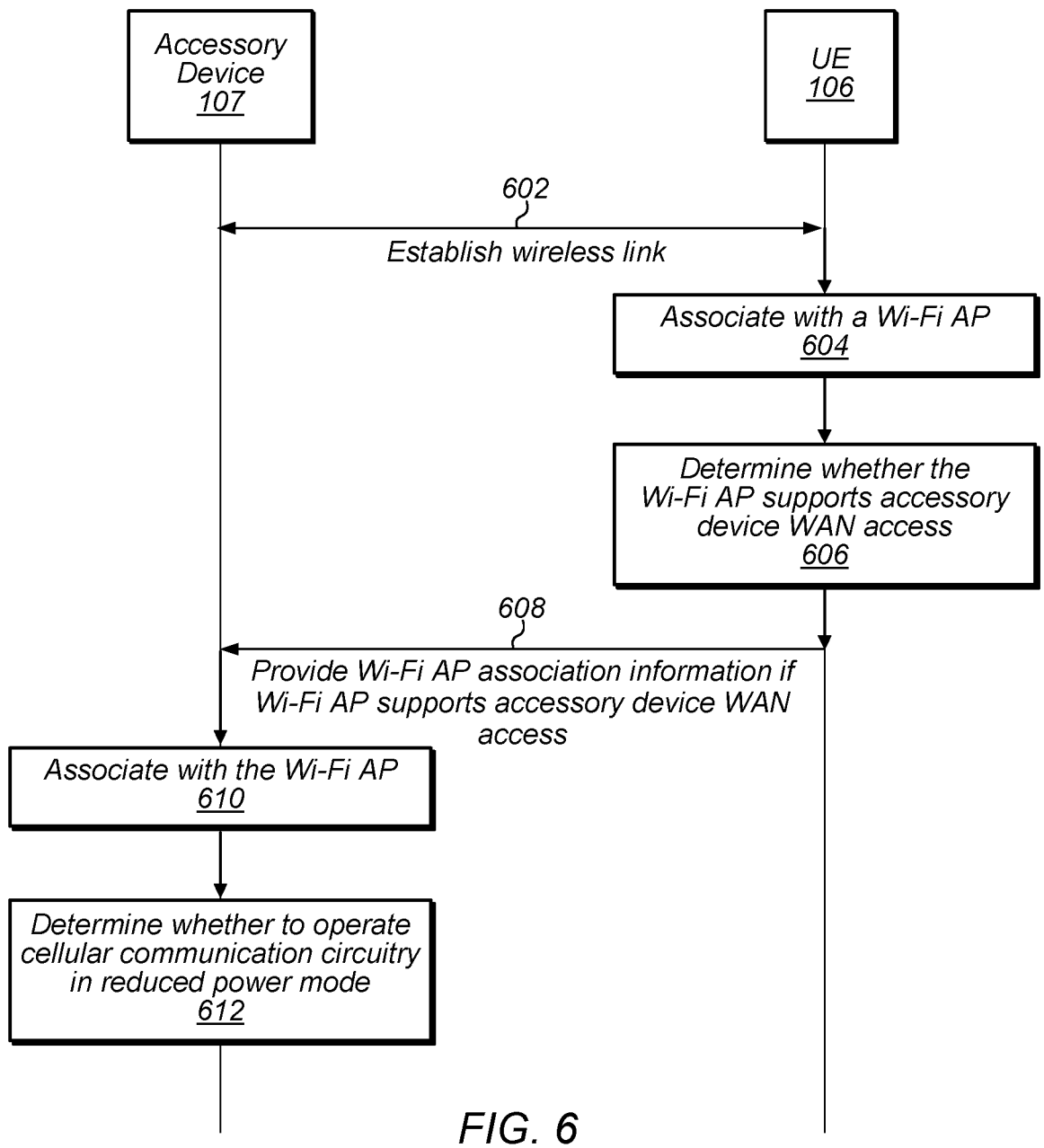
FIG. 6 is a communication flow diagram illustrating an exemplary method for performing wireless connection management for an accessory wireless device, according to some embodiments.

FIGS. 5-6—Example Coverage Scenario and Flowchart

FIG. 5 illustrates one possible example of a coverage scenario for smartphones and smart watches, according to some embodiments. As shown, a base station 502 may provide a cell for a variety of wireless devices, including various smartphones 506 and various smart watches 507. Such different types of devices may have differing characteristics that result in different effective communication ranges. Thus, as shown, the effective watch cell range 510 may be smaller than the effective smartphone cell range 520. As a result, while all of the illustrated smartphones (506A, 506B, 506C, 506D, 506E) may be within communicative range of the base station 502 and thus may be able to receive cellular communication service from the cell, only one of the illustrated smart watches (507A) may be within communicative range of the base station 502, and the remainder of the illustrated smart watches (507B, 507C, 507D) may be outside of communicative range of the base station 502. Unless there are one or more other cells within range of these smart watches 507B-D, they may be unable to obtain cellular communication service and may accordingly experience cellular service loss.

Thus, since cellular base station deployment may at least in some instances be arranged to provide efficient cellular communication coverage for smartphones and other devices with similar cellular communication ranges, coverage scenarios such as illustrated in FIG. 5 may result in smart watches and/or other devices with smaller than average cellular communication ranges (e.g., link budget limited devices) experiencing a greater variety of coverage conditions than some other devices, e.g., potentially including more commonly experiencing cell edge and/or out-of-service conditions, which may in turn affect the relative desirability of a cellular link at various times. Further, since cellular service recovery operations, cellular communications when at the edge of cellular communication range, and even cellular communications in general may at least in some instances be relatively more power consuming than Wi-Fi communications, it may be the case that some link budget limited devices with both cellular and Wi-Fi communication capability may be configured to prefer Wi-Fi communication over cellular communication.

For example, techniques that consider battery power as a limited resource and only selectively utilize cellular communication capabilities (e.g., potentially including when they might be available), particularly when an equivalently functional Wi-Fi communication link (e.g., that may support voice, short messaging service (SMS), and/or other services that might be available via cellular communication) is available, may have a notable beneficial effect on such link budget limited devices, at least in some instances.

However, in some instances, a Wi-Fi link may be available but may not provide equivalent functionality as a cellular link. For example, in some instances, a user could be in a situation in which an accessory device is associated to an un-authenticated Wi-Fi AP, and may try to perform IMS registration, but may be unable to do so. If the accessory device were to assume that having a Wi-Fi link provided sufficient communicative capability that cellular communication capability for the accessory device was not needed at such a time, this could result in a user of the accessory device not being able to use at least some desired communication services. At least for some devices, the only way to remedy such a situation may include the user explicitly forcing a companion device to the accessory device to forget/delete the network provided by the Wi-Fi AP from the companion's settings, and relay the information to the accessory device to clear such an un-authenticated AP from the memory of the accessory device. Thus, in such (and potentially other) instances, it may be useful to provide more nuanced wireless connectivity management techniques for accessory devices that are capable of utilizing multiple wireless communication technologies.

Accordingly, FIG. 6 is a flowchart diagram illustrating a method for performing wireless connection management for an accessory wireless device, according to some embodiments. Note that while such use of wireless connection management techniques may be particularly beneficial to link budget limited devices, it should be noted that such techniques may also be beneficial to non-link budget limited wireless devices (e.g., including wireless devices with larger cellular communication ranges, such as the smartphones illustrated in FIG. 5), at least in some instances. Accordingly, it should be noted that any or all aspects of the method of FIG. 6 may also or alternatively be used in conjunction with such devices if desired.

Aspects of the method of FIG. 6 may be implemented by a companion wireless device (such as a UE 106) and an accessory wireless device (such as an accessory device 107) illustrated in and described with respect to FIGS. 1-3, or more generally in conjunction with any of the computer systems or devices shown in the above Figures, among other devices, as desired.

In various embodiments, some of the elements of the methods shown may be performed concurrently, in a different order than shown, may be substituted for by other method elements, or may be omitted. Additional method elements may also be performed as desired. As shown, the method may operate as follows.

In 602, a companion wireless device (e.g., UE 106) and an accessory wireless device (e.g., accessory device 107) may establish a wireless link. The accessory device may be a smart watch, with a smartphone paired as the companion device, as one possibility. Any number of other accessory/companion device combinations are also possible. The accessory device may pair with the companion device using one or more short range wireless communication technologies. Pairing the accessory device with the companion device may create a link between the devices such that the devices may be able to wirelessly communicate when within communication range of one another. According to some embodiments, a paired relationship between devices may optionally additionally include or enable one or more further characteristics, such as any or all of one or more shared settings, user profiles and/or accounts, data synchronization between the devices, etc.

The accessory device and the companion device may be capable of communicating with each other using any or all of Bluetooth, Wi-Fi, near field communication (NFC), and/or any of various other possible short range communication protocols, according to some embodiments. Additionally, each of the accessory device and the companion device may be capable of performing cellular communication, according to some embodiments.

Although each of the accessory device and the companion device may be capable of communicating according to multiple wireless communication technologies, at least according to some embodiments, the accessory device may have different characteristics than the companion device that may affect their respective preferred usage patterns and relationships. For example, as noted above, as one possibility the accessory device might be a smart watch (or other wearable device), while the companion device might be a smart phone, and the accessory device might have more limited battery capacity and degraded antenna performance relative to the companion device.

In 604, the companion device may discover and associate with a Wi-Fi access point (AP). The companion device may discover the Wi-Fi AP by sending out a probe request, receiving a beacon advertising availability of a Wi-Fi network provided by the Wi-Fi access point, or in any other desired manner. Associating with the Wi-Fi access point may include exchanging configuration settings, authentication information, and/or any of various other possible types of information to allow companion device to communicate with other devices associated with the Wi-Fi network and/or other networks (e.g., one or more wide area networks such as the Internet, a cellular core network, a public switched telephone network, etc.), e.g., via a backhaul connection of the Wi-Fi AP. In some embodiments, the Wi-Fi AP may provide a network that is open/unencrypted/unprotected (e.g., that does not require a password/passphrase) and/or a network that is closed/encrypted/protected (e.g., that does require a password/passphrase). In some instances, user input (e.g., to select a network provided by the Wi-Fi AP, to enter a password/passphrase requested by the Wi-Fi AP, to complete captive portal registration requested by the Wi-Fi AP, etc.) may be provided by a user of the companion device as part of the discovery and/or association process.

In 606, the companion device may determine whether the Wi-Fi AP supports access to a wide area network (WAN) by the accessory device. The determination may be based on general considerations and/or considerations specific to the accessory device. For example, as one possibility, the companion device may perform a data probe (e.g., to any desired entity accessible via the WAN) to determine whether the WAN (or a more specific entity accessible via the WAN) is accessible via the Wi-Fi access point. In such a case, if the WAN is not accessible at all via the Wi-Fi access point, the companion device may directly determine that the Wi-Fi AP does not support access to the WAN by the accessory device since the Wi-Fi AP may not support any access to the WAN. As another possibility, the determination may be based at least in part on one or more characteristics of the Wi-Fi AP that may affect the accessory device specifically, but may not affect at least some other devices. For example, some accessory devices may not be configured to support captive portal registration, such that a Wi-Fi AP that provides a captive network (e.g., that requires captive portal registration) may be determined to not support access to the WAN by the accessory device. As another possibility, the accessory device might be capable of utilizing a captive network provided the companion device has performed captive portal registration and is authorized to utilize the captive network, in which case the determination of whether the Wi-Fi AP supports access to the WAN by the accessory device may depend on the registration status of the companion device with the Wi-Fi AP. For example, the Wi-Fi AP may be determined to support access to the WAN by the accessory device if the companion device is currently registered through the captive portal, and may be determined to not support access to the WAN by the accessory device if the companion device is not currently registered through the captive portal.

In 608, the companion device may provide Wi-Fi AP association information to the accessory device, e.g., based at least in part on determining that the Wi-Fi AP supports access to the WAN by the accessory device. Note that at least according to some embodiments, the companion device may refrain from providing the Wi-Fi AP association information for the Wi-Fi AP to the accessory device if it is determined that the Wi-Fi AP does not support access to the WAN by the accessory device.

The companion device may store information indicating whether the Wi-Fi AP supports access to the WAN by the accessory device. For example, the companion device may store information indicating that the Wi-Fi AP provides a captive network (and thus that the Wi-Fi AP does not support access to the WAN by the accessory device) and/or may geotag the Wi-Fi AP as a captive AP if the accessory device is not configured to be able to utilize captive networks. Such information may be useful, for example, if the companion device disassociates from a captive network (e.g., walks away from a coffee shop in which the Wi-Fi AP is located to make a phone call, as one possibility), then later re-associates with the same Wi-Fi AP while its registration is still valid. In this case, the stored information may be used by the companion device to determine not to provide association information for the Wi-Fi AP to the accessory device, e.g., even though the Wi-Fi AP may not prompt the companion device to perform captive portal registration at that time.

In 610, the accessory device may associate with the Wi-Fi AP, e.g., using the association information for the Wi-Fi AP provided by the companion device. At least according to some embodiments, the accessory device may be a device that does not directly provide a user interface (or provides a limited user interface) for managing Wi-Fi connectivity, e.g., such that the accessory device may not be able to select and perform authentication with a Wi-Fi AP without (e.g., at least initial) provision of association information for the Wi-Fi AP from a companion device to the accessory device. Alternatively, the accessory device may be a device that is capable of directly providing a user interface and/or is otherwise capable of autonomously associating with a Wi-Fi network. In either case, the accessory device may be capable of utilizing assistance from the companion device to select and perform authentication with a Wi-Fi AP using association information for the Wi-Fi AP that is provided from the companion device to the accessory device, and may accordingly use the association information for the Wi-Fi AP provided by the companion device to associate with the Wi-Fi AP. At least in some embodiments, the association with the Wi-Fi AP may be completed without user input to the accessory device; for example, the association information provided by the companion device may function as an implicit network selection indication, and/or may include password/passphrase information for obtaining access to a network provided by the Wi-Fi AP.

In 612, the accessory device may determine an operating mode in which to operate cellular communication circuitry of the accessory device. The accessory device may select the operating mode from multiple possible operating modes, e.g., at least including a full-feature operating mode and a reduced-power operating mode. Any number of additional or alternative operating modes may also be possible. The operating mode for the cellular communication circuitry may be determined based at least in part on the Wi-Fi connectivity status of the accessory device, at least according to some embodiments. For example, the accessory device may (e.g., also or alternatively to the companion device) perform a data probe to determine whether a WAN is accessible via the Wi-Fi access point (e.g., whether the Wi-Fi AP has a backhaul connection). If the data probe is successful, the accessory device may determine to operate the cellular communication circuitry of the accessory device in the reduced-power operating mode. If the data probe is unsuccessful, the accessory device may determine to operate the cellular communication circuitry of the accessory device in the full-feature operating mode (or otherwise in a higher functionality state than the reduced-power mode). Such a framework may help conserve battery power, potentially without compromising the ability of the accessory device to perform any desired data communication.

At least in some embodiments, the accessory device may additionally or alternatively base its determination of an operating mode for its cellular communication circuitry on one or more other considerations. For example, the accessory device may probe or otherwise check whether one or more specific communication services are available via the Wi-Fi AP. As one such possibility, the accessory device may determine whether an internet protocol (IP) multimedia subsystem network is available via the Wi-Fi access point. Such a check may be useful in case the accessory device is able to access a WAN (e.g., the Internet) more generally, but a specific aspect of a potential connection to the IP multimedia subsystem (IMS) is not functioning via the Wi-Fi AP. For example, in some instances, it may be possible that a routing issue could occur between an enhanced packet data gateway (EPDG) and a proxy call session control function (P-CSCF) of the IMS such that the accessory device may not be able to complete IMS registration, and thus may be unable to make voice calls via the IMS, by way of a Wi-Fi AP. In such a case, the accessory device may determine to operate the cellular communication circuitry of the accessory device in the full-feature operating mode (or otherwise in a higher functionality state than the reduced-power mode), while if the IMS network is available via the Wi-Fi AP, the accessory device may determine to operate the cellular communication circuitry of the accessory device in the reduced-power operating mode.

According to some embodiments, the accessory device may determine in which operating mode to operate its cellular communication circuitry based at least partially on one or both of the previously discussed considerations, and also based at least partially on one or more additional considerations. Such considerations may relate to the relative importance or value of making the cellular communication capability of the accessory device available at any given time. For example, in some instances, if there is no data communication (or only low priority data communication, such as background data communication and/or non-user-generated data communication) pending by the accessory device, this may bias the accessory device's determination of the operating mode of the cellular communication circuitry toward a reduced power/reduced feature operating mode, while if there is high priority data communication (or possibly any data communication) pending, this may bias the accessory device's determination of the operating mode of the cellular communication circuitry toward an increased power/increased feature operating mode.

Similarly, if desired, a current user activity level of the accessory device may impact the determination of an operating mode for the cellular communication circuitry. For example, in some instances, if there is relatively low user activity at a given time, this may bias the accessory device's determination of the operating mode of the cellular communication circuitry toward a reduced power/reduced feature operating mode, while if there is a relatively high user activity at a given time, this may bias the accessory device's determination of the operating mode of the cellular communication circuitry toward an increased power/increased feature operating mode, e.g., in order to better support the user's desired activity or activities.

As another possibility, even if the Wi-Fi AP does not currently have a backhaul connection (e.g., access to a WAN may be unavailable), the accessory device may not immediately determine to place the cellular communication circuitry in an increased power/increased feature operating mode, but may further consider a length of time for which the Wi-Fi access point has not had a backhaul connection. For example, if the Wi-Fi AP has only temporarily lost its backhaul connection, and the cellular communication circuitry is already in the reduced power operating mode, it may be wasteful to bring the cellular communication circuitry up to full (or at least higher) power operation for what may be a temporary loss of through-connectivity. Accordingly, in some embodiments, a shorter (e.g., below a certain threshold) amount of time for which the accessory device is unable to access the WAN via the Wi-Fi AP may bias the accessory device's determination of the operating mode of the cellular communication circuitry toward (e.g., remaining in) a reduced power/reduced feature operating mode, while a longer (e.g., above a certain threshold) amount of time for which the accessory device is unable to access the WAN via the Wi-Fi AP may bias the accessory device's determination of the operating mode of the cellular communication circuitry toward an increased power/increased feature operating mode.

As a still further possibility, the accessory device may consider its expectations with respect to the availability and/or quality of a cellular communication link, if its cellular communication circuitry were placed in an increased power/increased feature operating mode, when determining in which operating mode to operate its cellular communication circuitry. As previously noted, at least in some instances, the quality of a possible cellular link for a given device may vary under different conditions, such that at some times (e.g., when the accessory device is near cell center), it may be possible to establish a good quality cellular link, while at other times (e.g., when the accessory device is near cell edge or out-of-coverage), it may be possible only to establish a poor quality cellular link, or may not be possible to establish a cellular link at all. Thus, the desirability of bringing up its cellular communication circuitry for the accessory device may depend at least in part on its expectation of what conditions it may experience with respect to a possible cellular link.

Accordingly, in some embodiments, the accessory device may utilize one or more heuristics relating to recent (e.g., within a certain time range) cellular communication performed by the accessory device and/or cellular communication performed by the accessory device in a similar location (e.g., based on GNSS coordinates or as determined in any other desired manner). The heuristic(s) may be based on any or all of a radio access technology, latency, jitter, packet loss rate, signal strength, signal quality, a cell loading estimate, a most recently camped public land mobile network (PLMN) and/or a carrier associated with or experienced by the accessory device during the recent and/or similarly located cellular communication, among other possible metrics. At least according to some embodiments, a determination in accordance with the heuristic(s) that the recent and/or similarly located cellular communication provided a relatively poor connection may bias the accessory device's determination of the operating mode of the cellular communication circuitry toward (e.g., remaining in) a reduced power/reduced feature operating mode, while a relatively good connection may bias the accessory device's determination of the operating mode of the cellular communication circuitry towards an increased power/increased feature operating mode.

As a yet further possibility, the accessory device may consider a status of a cellular data plan of the accessory device. For example, if the cellular data plan for the accessory device has a relatively small (e.g., below a certain threshold) amount of data remaining, it may be considered more important to preserve the remaining data for high priority uses, while if the cellular data plan for the accessory device has a relatively large (e.g., above a certain threshold) amount of data remaining, it may be considered acceptable to utilize cellular data for more general purposes. Thus, at least in some embodiments, a smaller amount of data remaining may bias the accessory device's determination of the operating mode of the cellular communication circuitry toward (e.g., remaining in) a reduced power/reduced feature operating mode, while a larger amount of data remaining may bias the accessory device's determination of the operating mode of the cellular communication circuitry toward an increased power/increased feature operating mode.

Any or all such considerations may be considered, e.g., in combination, when determining the operating mode for the cellular communication circuitry of the accessory device. At least according to some embodiments, such a determination may be configured to attempt to provide a best overall user experience, potentially balancing preferences for longer battery life, efficient data budget usage, uninterrupted or minimally interrupted communication capability, and/or other end-goals that may commonly improve user experience, among various possibilities.

At least according to some embodiments, the accessory device may continuously monitor or occasionally (e.g., periodically or aperiodically) check in which operating mode to operate the cellular communication circuitry, e.g., as the considerations on which the determination is made may change over time. For example, in some instances, the Wi-Fi connectivity status of the accessory device may change, which may be triggered by the accessory device itself, or by the companion device.

For example, in some instances, even if the accessory device initially determined that the Wi-Fi access point supports access by the accessory device to the WAN and/or otherwise supports the communication services desired by the accessory device, the accessory device may later determine that the Wi-Fi access point no longer supports access by the accessory device to the WAN and/or otherwise supports the communication services desired by the accessory device. In such a case, the accessory device may disassociate from (and possibly delete association information for) the Wi-Fi access point.

Similarly, the companion device may later determine that the Wi-Fi access point no longer supports access by the accessory device to the WAN and/or otherwise supports the communication services desired by the accessory device, even if the companion device initially determined that the Wi-Fi access point supports access by the accessory device to the WAN and/or otherwise supports the communication services desired by the accessory device. For example, the Wi-Fi access point may have (e.g., temporarily or permanently) lost backhaul connectivity, such that a data probe to the WAN may be unsuccessful. As another possibility, the Wi-Fi access point may provide a captive network that supports data services for the accessory device while the companion device is registered through its captive portal, but the registration of the companion device may have expired. In such cases, the companion device may provide an indication to the accessory device to implement an exponential backoff mechanism or to disassociate altogether from (and possibly delete association information for) the Wi-Fi AP, e.g., in response to the unsuccessful data probe, registration expiration, or other cause for determining that the Wi-Fi access point no longer supports access by the accessory device to the WAN and/or otherwise supports the communication services desired by the accessory device. In response to such an indication, the accessory device may disassociate from (and possibly delete association information for) the Wi-Fi access point.

In the following further exemplary embodiments are provided.

One set of embodiments may include an apparatus, comprising: a processing element configured to cause a companion wireless device to: establish a wireless link with an accessory device; discover and associate with a Wi-Fi access point; perform a data probe to determine whether a wide area network is accessible via the Wi-Fi access point; determine whether to provide association information for the Wi-Fi access point to the accessory device based at least in part on a result of the data probe to the wide area network via the Wi-Fi access point.

According to some embodiments, the processing element is further configured to cause the companion wireless device to: provide association information for the Wi-Fi access point to the accessory device based at least in part on determining that the wide area network is accessible via the Wi-Fi access point, wherein association information for the Wi-Fi access point is not provided to the accessory device if the wide area network is determined to not be accessible via the Wi-Fi access point.

According to some embodiments, the processing element is further configured to cause the companion wireless device to: perform an additional data probe to determine whether the wide area network is accessible via the Wi-Fi access point at a later time; determine that the wide area network is not accessible via the Wi-Fi access point at the later time; and provide an indication to the accessory device to disassociate with the Wi-Fi access point based at least in part on determining that the wide area network is not accessible via the Wi-Fi access point at the later time.

According to some embodiments, the processing element is further configured to cause the companion wireless device to: determine that the Wi-Fi access point provides a captive network; determine to not provide association information for the Wi-Fi access point to the accessory device based at least in part on determining that the Wi-Fi access point provides a captive network; and store information indicating that the Wi-Fi access point provides a captive network.

According to some embodiments, the processing element is further configured to cause the companion wireless device to: disassociate with the Wi-Fi access point; re-associate with the Wi-Fi access point at a later time; and determine to not provide association information for the Wi-Fi access point to the accessory device based at least in part on the stored information indicating that the Wi-Fi access point provides a captive network.

According to some embodiments, the processing element is further configured to cause the companion wireless device to: determine that the Wi-Fi access point provides a captive network; perform captive portal registration with the captive network; determine whether the captive network supports data services for the accessory device; and determine whether to provide association information for the Wi-Fi access point to the accessory device based at least in part on determining whether the captive network supports data services for the accessory device.

According to some embodiments, the processing element is further configured to cause the companion wireless device to: provide association information for the Wi-Fi access point to the accessory device based at least in part on determining that the captive network supports data services for the accessory device, wherein association information for the Wi-Fi access point is not provided to the accessory device if the captive network does not support data services for the accessory device; determine, at a later time, that the captive portal registration with the captive network has expired; and provide, at the later time, an indication to the accessory device to disassociate with the Wi-Fi access point based at least in part on determining that the captive portal registration with the captive network has expired.

Another set of embodiments may include a method, comprising: by a companion wireless device: establishing a wireless link with an accessory wireless device; associating with a Wi-Fi access point; determining whether the Wi-Fi access point supports access by the accessory wireless device to a wide area network; and providing association information for the Wi-Fi access point to the accessory device based at least in part on determining that the Wi-Fi access point supports access by the accessory wireless device to the wide area network, wherein association information for the Wi-Fi access point is not provided to the accessory device if the Wi-Fi access point is determined not to support access by the accessory wireless device to the wide area network.

According to some embodiments, determining whether the Wi-Fi access point supports access by the accessory wireless device to the wide area network comprises determining whether the Wi-Fi access point requests captive portal registration, wherein the Wi-Fi access point is determined not to support access by the accessory wireless device to the wide area network if the Wi-Fi access point requests captive portal registration.

According to some embodiments, determining whether the Wi-Fi access point supports access by the accessory wireless device to the wide area network comprises performing a data probe to the wide area network via the Wi-Fi access point.

According to some embodiments, the method further comprises, by the companion wireless device: storing information indicating whether the Wi-Fi access point supports access by the accessory wireless device to the wide area network based at least in part on determining whether the Wi-Fi access point supports access by the accessory wireless device to the wide area network.

According to some embodiments, the method further comprises, by the companion wireless device: determining that the Wi-Fi access point no longer supports access by the accessory device to the wide area network; and providing an indication to the accessory device to disassociate with the Wi-Fi access point based at least in part on determining that the Wi-Fi access point no longer supports access by the accessory device to the wide area network.

A further set of embodiments may include an accessory device, comprising: an antenna; a radio coupled to the antenna; and a processing element coupled to the radio; wherein the accessory device is configured to: establish a wireless link with a companion device; receive association information for a Wi-Fi access point from the companion device; associate with the Wi-Fi access point using the association information received from the companion device; perform a data probe to determine whether a wide area network is accessible via the Wi-Fi access point; and determine whether to operate cellular communication circuitry of the accessory device in a reduced power mode based at least in part on whether the wide area network is accessible via the Wi-Fi access point.

According to some embodiments, the accessory device is further configured to: determine whether an internet protocol multimedia subsystem (IMS) network is accessible via the Wi-Fi access point; wherein determining whether to operate the cellular communication circuitry of the accessory device in a reduced power mode is further based at least in part on whether the IMS network is accessible via the Wi-Fi access point.

According to some embodiments, the accessory device is further configured to: determine, if the wide area network is not accessible via the Wi-Fi access point, a length of time for which the wide area network has not been accessible via the Wi-Fi access point, wherein determining whether to operate the cellular communication circuitry of the accessory device in a reduced power mode is further based at least in part on the length of time for which the wide area network has not been accessible via the Wi-Fi access point.

According to some embodiments, determining whether to operate the cellular communication circuitry of the accessory device in a reduced power mode is further based at least in part on one or more heuristics relating to recent cellular communication by the accessory device.

According to some embodiments, the one or more heuristics relating to recent cellular communication by the accessory device are based on one or more of: a latency experienced by the accessory device during the recent cellular communication; a jitter experienced by the accessory device during the recent cellular communication; a packet loss rate experienced by the accessory device during the recent cellular communication; a signal strength experienced by the accessory device during the recent cellular communication; a signal quality experienced by the accessory device during the recent cellular communication; or a carrier from which the accessory device obtained cellular service during the recent cellular communication.

According to some embodiments, determining whether to operate the cellular communication circuitry of the accessory device in a reduced power mode is further based at least in part on an amount of data remaining in a data plan for a user of the accessory device.

According to some embodiments, determining whether to operate the cellular communication circuitry of the accessory device in a reduced power mode is further based at least in part on a data type of a pending data communication.

According to some embodiments, determining whether to operate the cellular communication circuitry of the accessory device in a reduced power mode is further based at least in part on a current user activity level of a user of the accessory device.

Still another exemplary embodiment may include a method, comprising: performing, by a wireless device, any or all parts of the preceding examples.

Yet another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

In addition to the above-described exemplary embodiments, further embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a processing element configured to cause a companion wireless device to:
establish a wireless link with an accessory device;
discover and associate with a Wi-Fi access point;
perform a data probe to determine whether a wide area network is accessible via the Wi-Fi access point;
determine whether to provide association information for the Wi-Fi access point to the accessory device based at least in part on a result of the data probe to the wide area network via the Wi-Fi access point;
determine that the Wi-Fi access point provides a captive network;
determine to not provide association information for the Wi-Fi access point to the accessory device based at least in part on determining that the Wi-Fi access point provides a captive network; and
store information indicating that the Wi-Fi access point provides a captive network.

2. The apparatus of claim 1, wherein the processing element is further configured to cause the companion wireless device to:
provide association information for the Wi-Fi access point to the accessory device based at least in part on determining that the wide area network is accessible via the Wi-Fi access point,
wherein association information for the Wi-Fi access point is not provided to the accessory device if the wide area network is determined to not be accessible via the Wi-Fi access point.

3. The apparatus of claim 2, wherein the processing element is further configured to cause the companion wireless device to:
perform an additional data probe to determine whether the wide area network is accessible via the Wi-Fi access point at a later time;
determine that the wide area network is not accessible via the Wi-Fi access point at the later time; and
provide an indication to the accessory device to disassociate with the Wi-Fi access point based at least in part on determining that the wide area network is not accessible via the Wi-Fi access point at the later time.

4. The apparatus of claim 1, wherein the processing element is further configured to cause the companion wireless device to:
disassociate with the Wi-Fi access point;
re-associate with the Wi-Fi access point at a later time; and
determine to not provide association information for the Wi-Fi access point to the accessory device at the later time based at least in part on the stored information indicating that the Wi-Fi access point provides a captive network.

5. The apparatus of claim 1, wherein the processing element is further configured to cause the companion wireless device to:
perform captive portal registration with the captive network;
determine whether the captive network supports data services for the accessory device; and
determine whether to provide association information for the Wi-Fi access point to the accessory device based at least in part on determining whether the captive network supports data services for the accessory device.

6. The apparatus of claim 5, wherein the processing element is further configured to cause the companion wireless device to:
provide association information for the Wi-Fi access point to the accessory device based at least in part on determining that the captive network supports data services for the accessory device, wherein association information for the Wi-Fi access point is not provided to the accessory device if the captive network does not support data services for the accessory device;

determine, at a later time, that the captive portal registration with the captive network has expired; and provide, at the later time, an indication to the accessory device to disassociate with the Wi-Fi access point based at least in part on determining that the captive portal registration with the captive network has expired.

7. A method, comprising:

by a companion wireless device:

establishing a wireless link with an accessory wireless device;

associating with a Wi-Fi access point;

determining whether the Wi-Fi access point supports access by the accessory wireless device to a wide area network, wherein determining whether the Wi-Fi access point supports access by the accessory wireless device to the wide area network comprises determining whether the Wi-Fi access point requests captive portal registration, wherein the Wi-Fi access point is determined not to support access by the accessory wireless device to the wide area network if the Wi-Fi access point requests captive portal registration; and providing association information for the Wi-Fi access point to the accessory device based at least in part on determining that the Wi-Fi access point supports access by the accessory wireless device to the wide area network, wherein association information for the Wi-Fi access point is not provided to the accessory device if the Wi-Fi access point is determined not to support access by the accessory wireless device to the wide area network.

8. The method of claim 7, wherein determining whether the Wi-Fi access point supports access by the accessory wireless device to the wide area network comprises performing a data probe to the wide area network via the Wi-Fi access point.

9. The method of claim 8, further comprising, by the wireless companion device:

performing an additional data probe to determine whether the Wi-Fi access point supports access by the accessory wireless device to the wide area network at a later time;

determining that the wide area network is not accessible via the Wi-Fi access point at the later time based at least in part on the additional data probe; and providing an indication to the accessory device to disassociate with the Wi-Fi access point based at least in part on determining that the wide area network is not accessible via the Wi-Fi access point at the later time.

10. The method of claim 7, further comprising, by the companion wireless device:

storing information indicating whether the Wi-Fi access point supports access by the accessory wireless device to the wide area network based at least in part on determining whether the Wi-Fi access point supports access by the accessory wireless device to the wide area network.

11. The method of claim 7, further comprising, by the companion wireless device:

determining that the Wi-Fi access point no longer supports access by the accessory device to the wide area network; and providing an indication to the accessory device to disassociate with the Wi-Fi access point based at least in part on determining that the Wi-Fi access point no longer supports access by the accessory device to the wide area network.

12. An accessory device, comprising:

an antenna;

a radio coupled to the antenna; and a processing element coupled to the radio;

wherein the accessory device is configured to:

establish a wireless link with a companion device;

receive association information for a Wi-Fi access point from the companion device;

associate with the Wi-Fi access point using the association information received from the companion device;

perform a data probe to determine whether a wide area network is accessible via the Wi-Fi access point and to determine whether an internet protocol multimedia subsystem (IMS) network is accessible via the Wi-Fi access point; and determine whether to operate cellular communication circuitry of the accessory device in a reduced power mode based at least in part on whether the wide area network and the IMS network are accessible via the Wi-Fi access point.

13. The accessory device of claim 12, wherein the accessory device is further configured to:

determine, if the wide area network is not accessible via the Wi-Fi access point, a length of time for which the wide area network has not been accessible via the Wi-Fi access point, wherein determining whether to operate the cellular communication circuitry of the accessory device in a reduced power mode is further based at least in part on the length of time for which the wide area network has not been accessible via the Wi-Fi access point.

14. The accessory device of claim 12, wherein determining whether to operate the cellular communication circuitry of the accessory device in a reduced power mode is further based at least in part on one or more heuristics relating to recent cellular communication by the accessory device.

15. The accessory device of claim 14, wherein the one or more heuristics relating to recent cellular communication by the accessory device are based on one or more of:

a latency experienced by the accessory device during the recent cellular communication;

a jitter experienced by the accessory device during the recent cellular communication;

a packet loss rate experienced by the accessory device during the recent cellular communication;

a signal strength experienced by the accessory device during the recent cellular communication;

a signal quality experienced by the accessory device during the recent cellular communication; or a carrier from which the accessory device obtained cellular service during the recent cellular communication.

16. The accessory device of claim 12, wherein determining whether to operate the cellular communication circuitry of the accessory device in a reduced power mode is further based at least in part on an amount of data remaining in a data plan for the accessory device.

17. The accessory device of claim 12, wherein determining whether to operate the cellular communication circuitry of the accessory device in a reduced power mode is further based at least in part on a data type of a pending data communication.

18. The accessory device of claim 12, wherein determining whether to operate the cellular communication circuitry of the accessory device in a reduced power mode is further based at least in part on a current user activity level of the accessory device.

* * * * *